US012126756B1

United States Patent
Dahan et al.

(10) Patent No.: US 12,126,756 B1
(45) Date of Patent: Oct. 22, 2024

(54) SYSTEM AND METHOD FOR NOTIFYING AND DOCUMENTING SITUATIONS IN WHICH A SMARTPHONE IS ON SILENT MODE WHEN IS NOT ANSWERING A PHONE CALL

(71) Applicants: Meir Dahan, Tiberias (IL); Eliahu Antopolsky, Zichron Yaakov (IL)

(72) Inventors: Meir Dahan, Tiberias (IL); Eliahu Antopolsky, Zichron Yaakov (IL)

( * ) Notice: Subject to any disclaimer, the term of this patent is extended or adjusted under 35 U.S.C. 154(b) by 0 days.

(21) Appl. No.: 18/744,637

(22) Filed: Jun. 16, 2024

Related U.S. Application Data

(63) Continuation-in-part of application No. 18/387,020, filed on Nov. 4, 2023.

(51) Int. Cl.
*H04M 1/82* (2006.01)
*H04M 1/72463* (2021.01)

(52) U.S. Cl.
CPC ......... *H04M 1/82* (2013.01); *H04M 1/72463* (2021.01)

(58) Field of Classification Search
CPC ............................ H04M 1/72448; H04M 3/02
See application file for complete search history.

(56) References Cited

U.S. PATENT DOCUMENTS

| | | | | |
|---|---|---|---|---|
| 2008/0112555 A1* | 5/2008 | Johns | ..................... | H04M 1/642 379/207.02 |
| 2013/0324071 A1* | 12/2013 | Huh | ..................... | H04M 3/02 455/404.1 |
| 2014/0101611 A1* | 4/2014 | Lang | ..................... | G06F 3/04842 709/204 |
| 2014/0295898 A1* | 10/2014 | Piotr | ..................... | H04W 4/14 455/466 |
| 2015/0334222 A1* | 11/2015 | Cheng | ..................... | H04M 1/72436 455/412.1 |
| 2016/0198319 A1* | 7/2016 | Huang | ..................... | G06F 1/1694 455/412.2 |

FOREIGN PATENT DOCUMENTS

WO    WO-2010022533 A1 *  3/2010  ............ H04M 3/428

* cited by examiner

*Primary Examiner* — Farid Seyedvosoghi

(57) ABSTRACT

A computer method and system for notifying and documenting a situation in which a user's smartphone is on silent mode when a phone call from a caller's smartphone was not answered. The method and system includes the display on the screen of the user's smartphone a button to apply a silent-notifying-mode, the receive by the user's smartphone when is on the silent-notifying-mode the phone call, the send to the caller's smartphone a text message, the display of the message on the screen of the caller's smartphone, and the save of the message on the caller's smartphone. The message notifies the caller that the user's smartphone is on silent and serves as documentation that the user's smartphone was on silent when the phone call was not answered. The method and system notifies and enables the caller to make a repeated call to make the user's smartphone to ring.

2 Claims, 3 Drawing Sheets

SYSTEM AND METHOD FOR NOTIFYING AND DOCUMENTING SITUATIONS IN WHICH A SMARTPHONE IS ON SILENT MODE WHEN IS NOT ANSWERING A PHONE CALL

RELATED APPLICATIONS

This application is a continuation in part of U.S. patent application Ser. No. 18/387,020 filed on Nov. 4, 2023.

TECHNICAL FIELD

The present invention refers to a system and a method for notifying and documenting situations in which a smartphone is on silent mode when is not answering a phone call and for stopping smartphone silent mode by callers, based on informative messages they receive automatically from the person's smartphone to whom they call.

BACKGROUND ART

There is a variety of needs of smartphone users that put their smartphones on silent mode. The present invention discloses several different types of silent mode, different types of automatic messages informing callers as to the situation and even how to overcome the silent mode of the user's smartphone, and enables the users to manage silent modes on their smartphones.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

Figure 1:
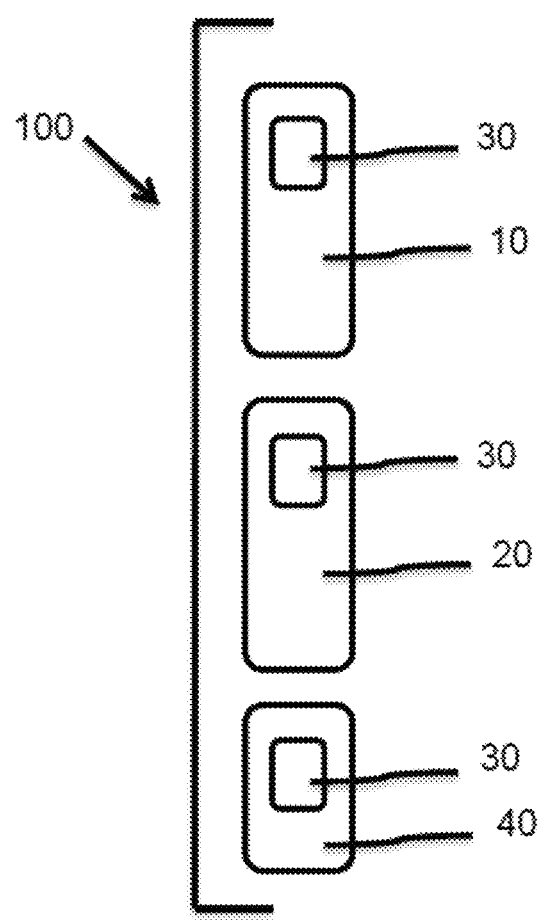
FIG. 1 depicts schematically the system (100).

The main objective of the present invention is to provide a computer system (100) for notifying and documenting situations in which a user's smartphone (10) is on silent mode when a phone call from a smartphone of a caller (20) to the user's smartphone was not answered. The system (100) includes processing devices (30) running on the smartphones (10) and (20), and possible also on a server (40). The system (100) is mainly configured to do one or more of the followings:

A. Display, by the user's smartphone, on a screen (11) of the user's smartphone a silent notifying button (51) that is configured to apply a silent-notifying-mode on the user's smartphone. It is possible that the user's smartphone will also include a standard silent mode button (50) that is configured to apply a standard silent mode on the user's smartphone.

The goal is to enable the user to activate only a standard silent mode by using the standard silent mode button, or to activate the silent-notifying-mode. The system can be configured to enable the user to use these two buttons or simply to use the silent notifying button to activate these two modes at once, to save the user from having to touch or tap two buttons. This explanation is relevant also to other buttons.

B. Receive, by the user's smartphone when is on the silent notifying mode, a phone call from the smartphone of the caller. Upon receiving such phone call when the user's smartphone is on the silent notifying mode, the system sends automatically from the user's smartphone to the caller's smartphone a notifying-documenting text message (60).

The notifying-documenting text message is designed to notify the caller by displaying the notifying-documenting text message on a screen (21) of the caller's smartphone that the user's smartphone is on silent mode. Also, the notifying-documenting text message is further designed to serve as a documentation that the user's smartphone was on silent mode when said phone call was not answered. The notifying-documenting text message can be sent over cellular protocol or internet protocol and can be sent after the phone call was not answered.

C. Display, by the caller's smartphone, the notifying-documenting text message on the screen of the caller's smartphone.

D. Save, by the caller's smartphone, the notifying-documenting text message in a messaging app on the caller's smartphone. The mobile phone number of the user's smartphone can be displayed in the messaging app on the caller's smartphone as a part of the notifying-documenting text message or nearby the notifying-documenting text message, as it happens regularly when the user send a text message to the caller.

Another embodiment version of the present computer system further includes the followings:

A. The silent notifying button is further configured to apply a stop-silent-mode on the user's smartphone. When the phone call is received from the caller's smartphone to the user's smartphone when the user's smartphone is on the stop-silent-mode, then the notifying-documenting text message is further designed to notify the caller that a repeated phone call from the caller's smartphone to the user's smartphone is configured to enable an alert mechanism (70) of the user's smartphone to be activated and to ring by the repeated phone call. It is possible that only if the repeated phone call received within a certain period of time, then the system will enable the alert mechanism to activate the ringing; a certain period of time that can be set in advance by the user or that is determined by the system.

B. Receive to the user's smartphone, when is on the stop-silent notifying mode, a repeated phone call from the caller's smartphone, and upon receiving the repeated phone call, enable automatically the alert mechanism of the user's smartphone to ring when receiving the repeated phone call. The system can be configured to save the details of the incoming calls to the user's smartphone (for example from which phone numbers they arrived and the times of the calls) and to compare the incoming calls to the saved incoming calls to determine if an incoming call can be considered as a repeated phone call.

Another embodiment of the present invention provides a computer system (200) for managing the silent modes on the user's smartphone that includes the user's smartphone and the processing device running on the user's smartphone itself or also on the processing device on the server. The system (200) is mainly configured to do the followings: To display, by the user's smartphone, on the screen of the user's smartphone the standard silent mode button that is configured to apply the silent mode on the user's smartphone. To display, by the user's smartphone, on the screen of the user's smartphone a momentary silent button (52) that is configured to apply a momentary silent mode on the user's smartphone or to apply the silent mode and the momentary silent mode. To receive, by the user's smartphone when is on the momentary silent mode, a phone call from the callers' smartphone. The system (200) automatically enables, by the user's smartphone, the alert mechanism of the user's smartphone to ring when the received incoming phone call continues and not answered for a predetermined number of rings or a predetermined period of time. Note, predetermined number of rings, refers to unsound rings.

The system (100) reflects also a computer-implemented method for notifying and documenting the situation in which the user's smartphone is on silent mode when the phone call from the smartphone of the caller to the user's smartphone was not answered. The method performed by the processing devices that are running on the smartphones. The computer-implemented method may include one or more of the following steps: Displaying by the user's smartphone on the screen of the user's smartphone the silent notifying button; Applying the silent-notifying-mode on the user's smartphone by using the silent notifying button; Receiving, by using the user's smartphone when is on the silent-notifying-mode, the phone call from the caller's smartphone; Sending, upon receiving the phone call, from the user's smartphone to the caller's smartphone a notifying-documenting text message; Displaying, by the caller's smartphone, the notifying-documenting text message on the screen of the caller's smartphone; Saving, by the caller's smartphone, the notifying-documenting text message in the messaging app on the caller's smartphone; The mobile phone number of the user's smartphone can be displayed in the messaging app on the caller's smartphone as a part of the notifying-documenting text message or nearby the notifying-documenting text message; The notifying-documenting text message is designed to notify the caller by displaying the notifying-documenting text message on the screen of the caller's smartphone that the user's smartphone is on silent mode; and the notifying-documenting text message is further designed to serve as a documentation that the user's smartphone was on silent mode when said phone call was not answered.

The computer-implemented method may further include: The silent notifying button is further configured to apply a stop-silent-mode on the user's smartphone; the receiving of the phone call from the caller's smartphone by the user's smartphone while the user's smartphone is on stop-silent-mode; the notifying-documenting text message is further designed to notify the caller that a repeated phone call from the caller's smartphone to the user's smartphone is configured to enable the alert mechanism of the user's smartphone to ring; Receiving to the user's smartphone, when is on the stop-silent notifying mode, the repeated phone call from the caller's smartphone; and upon receiving the repeated phone call, enabling automatically the alert mechanism of the user's smartphone to ring when receiving the repeated phone call.

The system reflects also a computer-implemented method for managing the silent modes on the smartphone of the user that is performed by the processing device running on the user's smartphone. The computer-implemented method can include the following means and steps: displaying, by using the user's smartphone, the standard silent mode button on the screen of the user's smartphone; displaying, by using the user's smartphone, the stop-silent notifying button on the screen of the user's smartphone; applying the silent mode and the stop-silent notifying mode on the user's smartphone by using the stop-silent notifying button or by using the standard silent mode button and the stop-silent notifying button; receiving, by using the user's smartphone when is on the stop-silent notifying mode, an incoming call from the caller's smartphone; upon receiving the incoming call, automatically sending, by using the user's smartphone when is on the stop-silent notifying mode, from the user's smartphone to the caller's smartphone the stop-silent informing message that is designed to inform the caller that the user's smartphone is on the silent mode and that a repeated call from the caller's smartphone to the user's smartphone is configured to enable an alert mechanism of the user's smartphone to ring; receiving to the user's smartphone, by using the user's smartphone when is on the stop-silent notifying mode, the repeated incoming call from the caller's smartphone; and upon receiving the repeated incoming call, automatically enabling the alert mechanism of the user's smartphone to ring when receiving the repeated call from the caller's smartphone.

The system reflects also a computer-implemented method for managing the silent modes on the smartphone of the user that is performed by the processing device running on the user's smartphone. The computer-implemented method can include the following means and steps: displaying, by using the user's smartphone, the standard silent mode button on the screen of the user's smartphone; displaying, by using the user's smartphone, the momentary silent button on the screen of the user's smartphone; applying the silent mode and the momentary silent mode on the user's smartphone by using the momentary silent button or by using the standard silent mode button and the momentary silent button; receiving, by using the user's smartphone when is on the momentary silent mode, an incoming call from the caller's smartphone; and automatically enabling, by using the user's smartphone, the alert mechanism of the user's smartphone to ring when the received incoming call continues and not answered for a predetermined number of rings or a predetermined period of time.

The term "smartphone" refers to any kind of cellphone, smartphone, mobile device or a computer that is designed to have an internet connection and to receive calls or messages over internet protocol or cellular protocol. The term "processing device" refers to a processing device on a server or on the smartphone, or both.

The buttons (50), (51) and (52) may be visible on the screen of the user's smartphone or may be invisible. Therefore the term "displaying" with regards to these buttons is illustrative. The use of these buttons may be done by tapping on or touching a graphic symbol on the screen of the smartphone or physical buttons on it, by tapping on or touching the screen of the smartphone in a certain way, by tilting the smartphone in a certain way, or in any other way that is commonly used to select an option or to execute an action on mobile devices such smartphones with touch screens. The term 'displaying a button' in this disclosure and in the claims means: providing the user with the option to execute the actions that these 'buttons' are designed to execute or perform, even though that the user's eye doesn't really see a button or anything on the screen. For example, placing three fingers on the screen and quickly sliding them down can cause some action on the device. In addition to that, it is possible that one button will be used to be function as two or more of the buttons, so that for example one button may be used to make the silent mode and/or the silent notifying mode and/or the stop-silent notifying mode and/or the momentary silent mode, and the button or buttons can be a kind of a modes button or option mode selection button.

The method of the preset invention can be realized and performed through a feature that the operator of communication applications and phone service providers can add to it or which is more likely by the manufacturers of the smartphones.

The present invention meets a real and specific need, which is not answered by the present art. The fact that the user informs automatically the callers that he is on mute (silent mode) shows a very kind attitude and may cause the caller to relax that all is ok with the user and that he simply on mute. This silent notifying message will also cause the caller not to call repeatedly. Sending the stop-silent notifying message to the caller for informing him that the user gives the caller the option to execute a repeated call that will be heard (ring) despite the silent mode improves this service.

Figure 2:
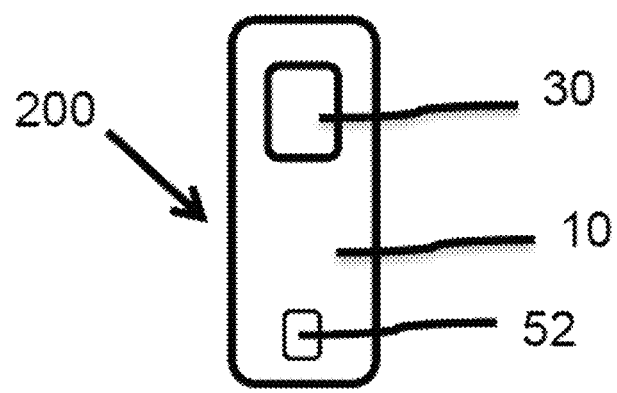
FIG. 2 depicts schematically the system (200).
Figure 3:
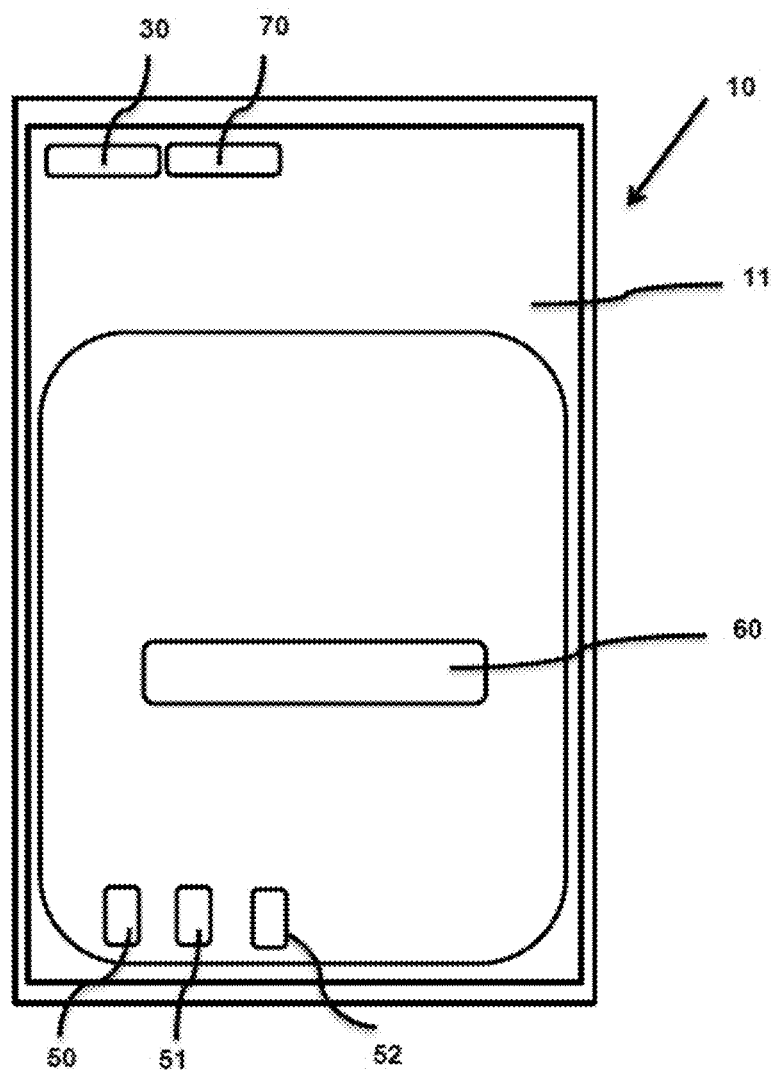
FIG. 3 depicts schematically the user's smartphone (10).
Figure 4:
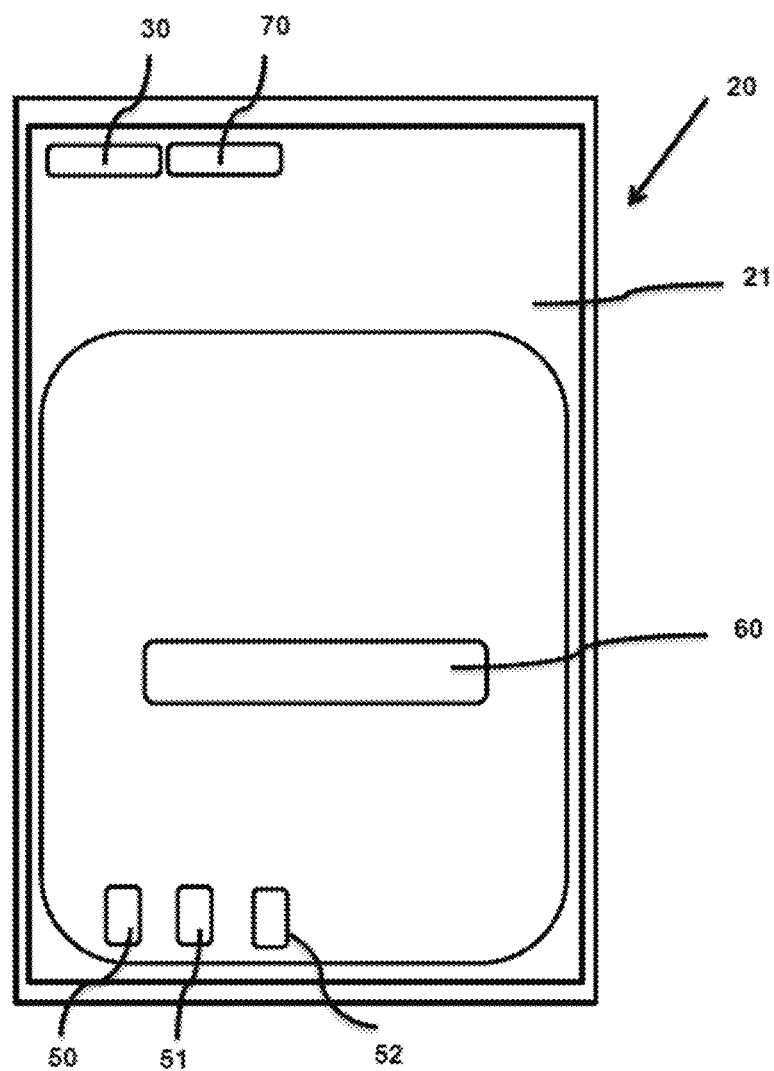
FIG. 4 depicts schematically the caller's smartphone (20).

FIG. 1 depicts schematically the system (100), FIG. 2 depicts schematically the system (200), FIG. 3 depicts schematically the user's smartphone (10), and FIG. 4 depicts schematically the caller's smartphone (20).

What is claimed is:

1. A computer system for managing a silent mode on a user's smartphone, the computer system comprising:
   One or more processing devices on the user's smartphone, wherein the computer system is configured to:
   display, on a screen of the user's smartphone, a silent mode notification button configured to apply a stop-silent-mode on the user's smartphone;
   receive, when the user's smartphone is in stop-silent-mode, an incoming phone call from a caller's smartphone;
   send, upon receiving said incoming phone call, a notifying text message from the user's smartphone to the caller's smartphone; wherein the notifying text message is configured to be displayed on a screen of the caller's smartphone, to inform the caller that the user's smartphone is in silent mode and that a repeated phone call from the caller's smartphone to the user's smartphone will enable an alert mechanism of the user's smartphone to ring;
   receive, by the user's smartphone, when in stop-silent-mode, a repeated phone call from the caller's smartphone; and
   upon receiving said repeated phone call, enable the alert mechanism of the user's smartphone to ring in response to the repeated phone call.

2. A method for managing a silent mode on a user's smartphone, the method comprising:
   displaying, on a screen of the user's smartphone, a silent mode notification button configured to apply a stop-silent-mode on the user's smartphone;
   receiving, when the user's smartphone is in stop-silent-mode, an incoming phone call from a caller's smartphone;
   sending, upon receiving said incoming phone call, a notifying text message from the user's smartphone to the caller's smartphone; wherein the notifying text message is configured to be displayed on a screen of the caller's smartphone, to informs the caller that the user's smartphone is in silent mode and that a repeated phone call from the caller's smartphone to the user's smartphone will enable an alert mechanism of the user's smartphone to ring;
   receiving, by the user's smartphone, when in stop-silent-mode, a repeated phone call from the caller's smartphone; and
   enabling the alert mechanism of the user's smartphone to ring upon receiving said repeated phone call.

* * * * *